(12) United States Patent
Tanaka et al.

(10) Patent No.: US 12,181,881 B2
(45) Date of Patent: Dec. 31, 2024

(54) INFORMATION OUTPUT APPARATUS, INFORMATION OUTPUT METHOD AND PROGRAM

(71) Applicant: KDDI CORPORATION, Tokyo (JP)

(72) Inventors: Takaya Tanaka, Tokyo (JP); Hiroshi Kawana, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 308 days.

(21) Appl. No.: 17/953,837

(22) Filed: Sep. 27, 2022

(65) Prior Publication Data

US 2023/0100982 A1 Mar. 30, 2023

(30) Foreign Application Priority Data

Sep. 30, 2021 (JP) ................................. 2021-161751

(51) Int. Cl.
*G05D 1/00* (2024.01)
*B64C 39/02* (2023.01)
(Continued)

(52) U.S. Cl.
CPC ......... *G05D 1/0094* (2013.01); *B64C 39/024* (2013.01); *G05D 1/101* (2013.01);
(Continued)

(58) Field of Classification Search
CPC .... G05D 1/0094; G05D 1/101; G05D 1/0011; G05D 1/0072; B64C 39/024;
(Continued)

(56) References Cited

U.S. PATENT DOCUMENTS

2020/0001998 A1* 1/2020 Rao .................. G05D 1/101
2020/0159251 A1* 5/2020 Iwasaki ............. B60R 16/037
(Continued)

FOREIGN PATENT DOCUMENTS

JP 2008-105591 A 5/2008
JP 2020-009060 A 1/2020
(Continued)

OTHER PUBLICATIONS

DJI Maintenance Program Enjoy Safe, Reliable Flight [online], the Internet archive, Feb. 10, 2021, URL<https://web.archive.org/web/20210210193107/https://enterprise.dji.com/enterprise-maintenance>, date of search Dec. 20, 2021, 4 pages.

*Primary Examiner* — Donald J Wallace
*Assistant Examiner* — Jalal C Coduroglu
(74) *Attorney, Agent, or Firm* — Foley & Lardner LLP

(57) ABSTRACT

An information output apparatus provided with an acquisition unit that acquires machine identification information and information indicating an operation amount; an identification unit that identifies at least one of a model type of the unmanned moving apparatuses, a purpose of use of the unmanned moving apparatuses, an operation region of the unmanned moving apparatus or component information indicating a component included in the unmanned moving apparatuses, which are associated with the machine identification information; a selection unit that selects an inspection threshold value corresponding to the attribute, as an attribute of the unmanned moving apparatus; a determination unit that determines whether or not a cumulative operation amount calculated by cumulating the operation amount is greater than the inspection threshold value; and an output unit that outputs determination results from the determination unit.

10 Claims, 6 Drawing Sheets

(51) Int. Cl.
*B64U 30/20* (2023.01)
*B64U 101/30* (2023.01)
*G06Q 30/018* (2023.01)
*G06Q 40/08* (2012.01)

(52) U.S. Cl.
CPC ........... *G06Q 30/018* (2013.01); *G06Q 40/08* (2013.01); *B64U 30/20* (2023.01); *B64U 2101/30* (2023.01)

(58) Field of Classification Search
CPC ...... G06Q 30/018; G06Q 40/08; B64U 30/20; B64U 2101/30
See application file for complete search history.

(56) References Cited

U.S. PATENT DOCUMENTS

| | | | |
|---|---|---|---|
| 2020/0234495 A1* | 7/2020 | Nakao | A63F 13/5258 |
| 2021/0035282 A1* | 2/2021 | Plihal | G06T 7/246 |
| 2022/0067081 A1* | 3/2022 | Saito | G06F 16/55 |
| 2024/0034362 A1* | 2/2024 | Oba | B60W 60/0051 |

FOREIGN PATENT DOCUMENTS

| | | |
|---|---|---|
| JP | 2020-166760 A | 10/2020 |
| WO | WO-2019/225762 A1 | 11/2019 |

* cited by examiner

FIG. 3

| DETERMINATION CATEGORY | PURPOSE OF USE α | | PURPOSE OF USE β | | OPERATION REGION X | | OPERATION REGION Y | |
|---|---|---|---|---|---|---|---|---|
| | MODEL A | MODEL B | MODEL A | MODEL B | MODEL A | MODEL B | MODEL A | MODEL B |
| CUMULATIVE OPERATION DISTANCE (km) | 1000 | 500 | 700 | 600 | 1000 | 500 | 700 | 600 |
| CUMULATIVE OPERATION TIME (HOURS) | 800 | 300 | 600 | 700 | 800 | 300 | 600 | 700 |
| NUMBER OF TIMES OPERATED (TIMES) | 100 | 200 | 200 | 300 | 100 | 200 | 200 | 300 |
| ELAPSED TIME SINCE MANUFACTURE (DAYS) | 200 | 100 | 150 | 50 | 200 | 100 | 150 | 50 |
| ELAPSED TIME SINCE PURCHASE (DAYS) | 300 | 150 | 200 | 100 | 300 | 150 | 200 | 100 |
| MAXIMUM SINGLE OPERATION DISTANCE (km) | 10 | 20 | 10 | 15 | 10 | 20 | 10 | 15 |
| MAXIMUM SINGLE OPERATION TIME (HOURS) | 10 | 20 | 10 | 20 | 10 | 20 | 10 | 20 |
| NUMBER OF TIMES A DESIGNATED SPEED WAS NOT REACHED (TIMES) | 2 | 2 | 1 | 2 | 2 | 2 | 2 | 2 |
| NUMBER OF TIMES AN ABNORMALITY WAS DETECTED IN ANY COMPONENT (TIMES) | 2 | 3 | 1 | 2 | 2 | 3 | 1 | 2 |

INFORMATION OUTPUT APPARATUS, INFORMATION OUTPUT METHOD AND PROGRAM

CROSS REFERENCE TO RELATED APPLICATION

Priority is claimed on Japanese Patent Application No. 2021-161751, filed Sep. 30, 2021, the content of which is incorporated herein by reference.

BACKGROUND OF THE INVENTION

Field of the Invention

The present invention relates to an information output apparatus, an information output method and a program for managing an unmanned moving apparatus that moves in air or in water.

Description of Related Art

In order to safely use unmanned moving apparatuses such as drones, repair and maintenance is performed in response to failures and abnormalities in the unmanned moving apparatuses (for example, WO 2019/225762, hereinafter referred to as Patent Document 1).

SUMMARY OF THE INVENTION

Therefore, an objective thereof is to provide an information output apparatus, an information output method and a program that can allow a user to recognize whether or not an unmanned moving apparatus is being inspected with appropriate frequency.

An information output apparatus according to a first aspect of this disclosure is provided with an acquisition unit that acquires machine identification information for identifying an unmanned moving apparatus and information indicating an operation amount by which the unmanned moving apparatus has been operated; an identification unit that identifies at least one of a model type of the unmanned moving apparatuses, a purpose of use of the unmanned moving apparatuses, an operation region of the unmanned moving apparatus or component information indicating a component included in the unmanned moving apparatuses, which are associated with the machine identification information acquired by the acquisition unit, as an attribute of the unmanned moving apparatus; a selection unit that selects an inspection threshold value corresponding to the attribute identified by the identification unit; a determination unit that determines whether or not a cumulative operation amount calculated by cumulating the operation amount is greater than the inspection threshold value selected by the selection unit; and an output unit that outputs determination results from the determination unit.

The information output apparatus may further be provided with an operation restriction unit that prohibits operation of the unmanned moving apparatus if the determination unit has determined that the cumulative operation amount is greater than the inspection threshold value selected by the selection unit.

The acquisition unit may respectively acquire the machine identification information and the cumulative operation amounts of multiple unmanned moving apparatuses; and the selection unit may select the unmanned moving apparatus to be operated next among the multiple unmanned moving apparatuses, based on the machine identification information and cumulative operation amounts of the multiple unmanned moving apparatuses.

The determination unit may determine, based on error history information indicating a history of abnormalities detected in the unmanned moving apparatus, whether or not a frequency by which the abnormalities have been detected is greater than a prescribed frequency threshold value; and the output unit may output a first determination result of a determination by the determination unit regarding whether or not the cumulative operation amount is greater than the inspection threshold value selected by the selection unit, and a second determination result of a determination by the determination unit regarding whether or not the frequency by which abnormalities have been detected is greater than the frequency threshold value.

The information output apparatus may further be provided with a storage unit that stores condition regarding an elapsed time period since the unmanned moving apparatus was purchased, an elapsed time period since the unmanned moving apparatus was last inspected, the cumulative operation amount or a purpose of use, for being covered by insurance in which a user of the unmanned moving apparatus is enrolled; and a reception unit that receives an operation reservation for operating the unmanned moving apparatus; wherein the determination unit determines whether or not the unmanned moving apparatus satisfies the condition based on the reception unit having received the operation reservation.

The acquisition unit may acquire a captured machine image generated by capturing an image of the unmanned moving apparatus. The information output apparatus may further be provided with a reception unit that receives input information that has been input by a user of the unmanned moving apparatus in association with the captured machine image; and a transmission control unit that transmits the captured machine image to a prescribed contact destination if it is determined that the input information indicates malfunction details.

The information output apparatus may further be provided with a generation unit that generates an inspection table in which the model types of the unmanned moving apparatuses are associated with the inspection threshold values based on statistical information regarding malfunctions that have occurred in the past in the multiple unmanned moving apparatuses; wherein the identification unit may identify the model type of the unmanned moving apparatuses as the attribute of the unmanned moving apparatuses, and the determination unit may reference the inspection table and identify the inspection threshold value that corresponds, in the inspection table, to the model type of the unmanned moving apparatus identified by the identification unit.

The information output apparatus may further be provided with a premium setting unit that lowers an insurance premium on insurance in which the user of the unmanned moving apparatus is enrolled if the cumulative operation amount is greater than the inspection threshold value.

An information output method according to a second aspect of this disclosure, to be executed by a computer, includes acquiring machine identification information for identifying an unmanned moving apparatus and information indicating an operation amount by which the unmanned moving apparatus has been operated; identifying at least one of a model type of the unmanned moving apparatuses, a purpose of use of the unmanned moving apparatuses, an operation region of the unmanned moving apparatus or component information indicating a component included in the unmanned moving apparatuses, which are associated with the machine identification information that has been acquired, as an attribute of the unmanned moving apparatus; selecting an inspection threshold value corresponding to the attribute that has been identified; determining whether or not a cumulative operation amount calculated by cumulating the operation amount is greater than the inspection threshold value that has been selected; and outputting determination results.

A non-transitory computer-readable recording medium storing a program according to a third aspect of this disclosure makes a computer execute processes, the processes including acquiring machine identification information for identifying an unmanned moving apparatus and information indicating an operation amount by which the unmanned moving apparatus has been operated; identifying at least one of a model type of the unmanned moving apparatuses, a purpose of use of the unmanned moving apparatuses, an operation region of the unmanned moving apparatus or component information indicating a component included in the unmanned moving apparatuses, which are associated with the machine identification information that has been acquired, as an attribute of the unmanned moving apparatus; selecting an inspection threshold value corresponding to the attribute that has been identified; determining whether or not a cumulative operation amount calculated by cumulating the operation amount is greater than the inspection threshold value that has been selected; and outputting determination results.

BRIEF DESCRIPTION OF THE DRAWINGS

FIG. 3 illustrates an example of an inspection table.

DETAILED DESCRIPTION OF THE INVENTION

[Outline of Information Output System]

Figure 1:
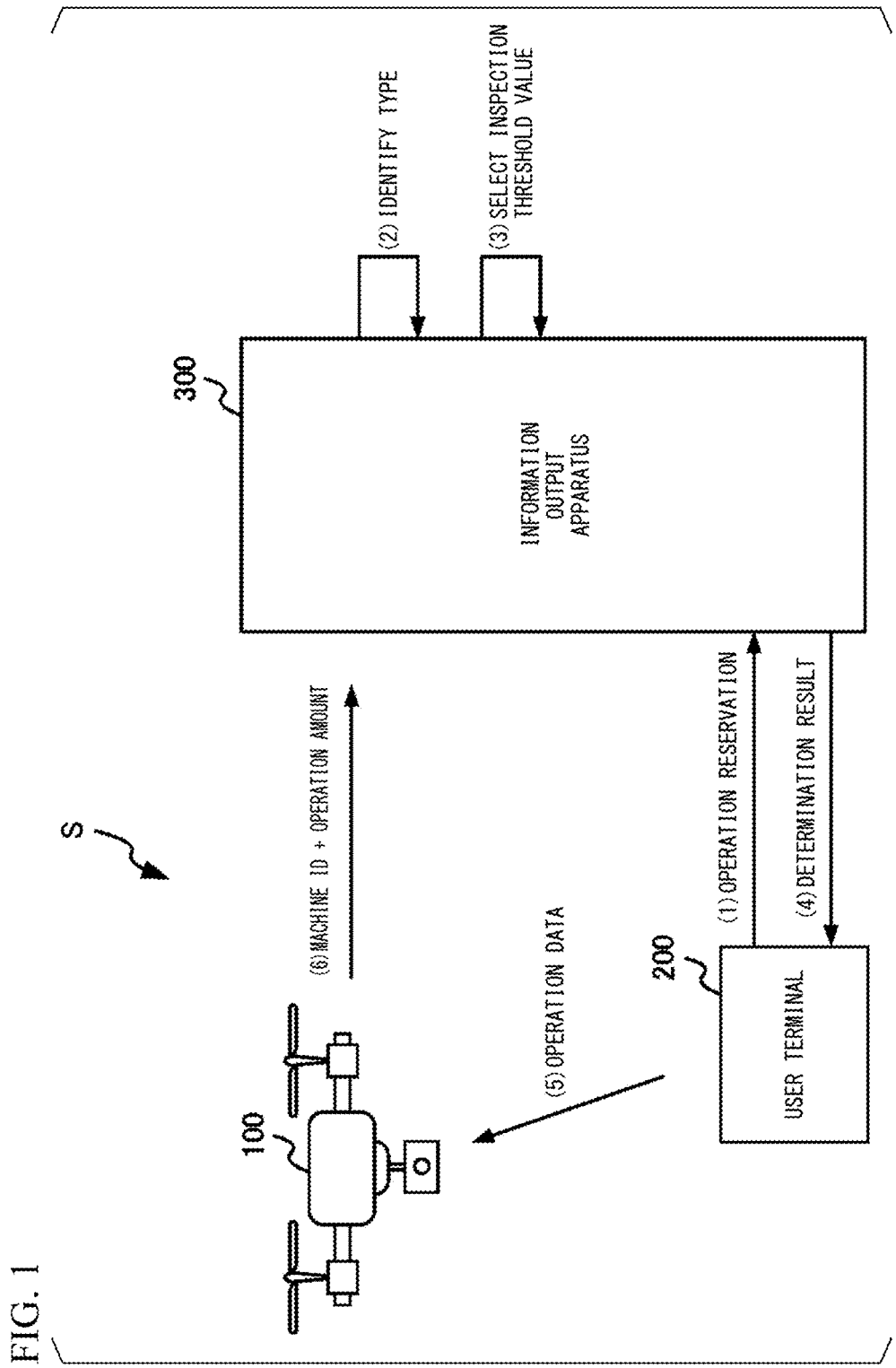
FIG. 1 illustrates an outline of an information output system S according to an embodiment.

FIG. 1 illustrates an outline of an information output system S according to the present embodiment. The information output system S comprises an unmanned moving apparatus 100, a user terminal 200 and an information output apparatus 300.

The unmanned moving apparatus 100 is, for example, a flying drone. The unmanned moving apparatus 100 may also be a marine or terrestrial drone. The unmanned moving apparatus 100 moves based on operation data or operation schedule data received from a user terminal 200 via a wireless communication line such as, for example, LTE or Wi-Fi (registered trademark). The operation schedule data is data indicating locations and times at which the unmanned moving apparatus 100 should move.

The user terminal 200 is, for example, a tablet. The user terminal 200 is, for example, a terminal of the owner of the unmanned moving apparatus 100. However, it may be a terminal of a worker performing maintenance on the unmanned moving apparatus 100. The user terminal 200 transmits the operation data or the operation schedule data for making the unmanned moving apparatus 100 move via the wireless communication line.

The information output apparatus 300 is an apparatus, for example, a server, that determines whether or not the unmanned moving apparatus 100 is being inspected with appropriate frequency. The information output apparatus 300 communicates with the unmanned moving apparatus 100 and the user terminal 200 over a network. The information output apparatus 300 determines whether or not the unmanned moving apparatus 100 requires to be inspected, for example, by comparing a cumulative operation amount of the unmanned moving apparatus 100 with an inspection threshold value associated with the unmanned moving apparatus 100 or with a component included in the unmanned moving apparatus 100. The cumulative operation amount is the cumulative value of the operation distance or the operation time from when the unmanned moving apparatus 100 started being used.

Inspection are, for example, performed at times recommended by the manufacturer of the unmanned moving apparatus 100, by the manufacture of a component included in the unmanned moving apparatus 100, or by an insurance company, or at a time required in advance by laws, regulations or the like.

The inspection threshold value is a reference value for determining times at which inspections are required and is used for determining whether or not an inspection is required. The inspection threshold value is a reference value regarding, for example, the cumulative operation amount that is the cumulative value of time or distance for which the unmanned moving apparatus 100 has been operated, the cumulative usage time of a component mounted on the unmanned moving apparatus 100, the number of times that the unmanned moving apparatus 100 has been operated, the degree of deterioration in the performance of the unmanned moving apparatus 100 or a component mounted on the unmanned moving apparatus 100 (power storage time of a battery), etc.

The information output apparatus 300 notifies the user terminal 200 of the results of determining whether or not an inspection is required. By checking whether an inspection is required in the notification, the user using the user terminal 200 can be prevented from operating the unmanned moving apparatus 100 despite being in a state requiring inspection.

The user terminal 200 may be configured to be able to transmit, to the unmanned moving apparatus 100, operation data or operation schedule data on the condition that a result indicating that an inspection is unrequired has been received from the information output apparatus 300.

Hereinafter, the flow of the processing in the information output system S will be explained with reference to FIG. 1. When the user has performed an operation on the user terminal 200 to make a reservation to use the unmanned moving apparatus 100, the user terminal 200 transmits operation reservation data to the information output apparatus 300 (step (1) in FIG. 1). The operation reservation data includes, for example, machine identification information (hereinafter referred to as a "machine ID") for identifying the unmanned moving apparatus 100 to be used by the user. The operation reservation data may include data including the date and time at which the user is to use the unmanned moving apparatus 100, data indicating the purpose of use, data indicating the region to be use, etc.

The information output apparatus 300 identifies the type of the unmanned moving apparatus 100, which is stored in association with the machine ID included in the operation reservation data acquired from the user terminal 200 (step (2) in FIG. 1). The information output apparatus 300 selects an inspection threshold value corresponding to the identified machine type by referencing an inspection table indicating inspection threshold values corresponding to types of unmanned moving apparatuses 100 (step (3) in FIG. 1).

The information output apparatus 300 stores the machine ID in association with a cumulative operation amount, which is the cumulative value of the operation amount up until the previous time the unmanned moving apparatus 100 was operated. The information output apparatus 300 determines whether or not the cumulative operation amount of the unmanned moving apparatus 100 is greater than the inspection threshold value corresponding to the machine type of the unmanned moving apparatus 100. The information output apparatus 300 outputs the determination result to the user terminal 200 (step (4) in FIG. 1).

If the determination results indicate that an inspection is unnecessary, then the user terminal 200 transmits the operation data corresponding to the operations by the user to the unmanned moving apparatus 100 (step (5) in FIG. 1). The unmanned moving apparatus 100, during operation or after operation has ended, transmits the machine ID, together with the operation amount, to the information output apparatus 300 (step (6) in FIG. 1). The information output apparatus 300 updates the cumulative operation amount by adding the received operation amount to the stored cumulative operation amount, and uses the updated cumulative operation amount when the next operation reservation data is received.

The user terminal 200 may receive, from a user, the results of visual inspection of the unmanned moving apparatus 100 by the user, or captured images generated by capturing images of the unmanned moving apparatus 100, and the visual inspection results or the captured images may be transmitted to the information output apparatus 300. In this case, the information output apparatus 300 may determine whether or not an inspection is required further based on the visual inspection results or the captured images.

[Structure of Information Output Apparatus]

Figure 2:
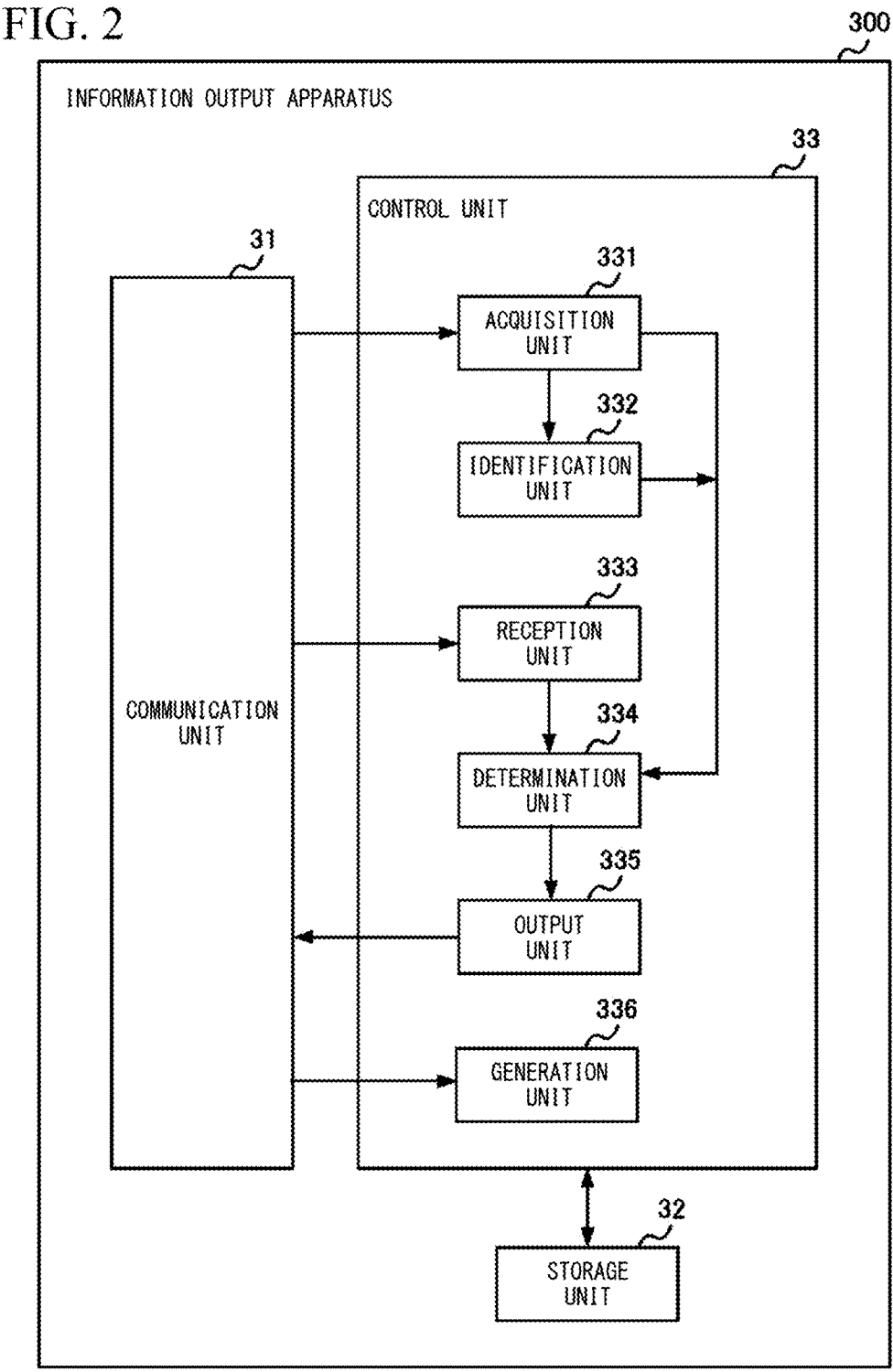
FIG. 2 illustrates the structure of an information output apparatus.

FIG. 2 illustrates the structure of the information output apparatus 300. The information output apparatus 300 comprises a communication unit 31, a storage unit 32 and a control unit 33. The control unit 33 comprises an acquisition unit 331, an identification unit 332, a reception unit 333, a determination unit 334, an output unit 335 and a generation unit 336.

The communication unit 31 is an interface for communicating with unmanned moving apparatuses 100 and user terminals 200 across a network. The storage unit 32 is a storage medium including a ROM (Read-Only Memory), a RAM (Random Access Memory) and the like. The storage unit 32 stores a program executed by the control unit 33. The storage unit 32, for example, stores a user table in which items of terminal identification information (hereinafter referred to as "terminal IDs") for identifying the user terminals 200 are associated with machine IDs.

Additionally, the storage unit 32 stores an apparatus table in which multiple machine IDs are respectively associated with multiple items of apparatus information. The apparatus information includes information indicating the model type of an unmanned moving apparatus 100, the purpose for which the unmanned moving apparatus 100 is to be operated, or the components included in the unmanned moving apparatus (hereinafter referred to as "components information"). The purpose of using the unmanned moving apparatus 100 may, for example, be for monitoring or for transporting goods. The purpose of use may include information indicating whether or not the unmanned moving apparatus 100 will move within metropolitan airspace. The components information is, for example, a model number for a motor or a battery mounted on the unmanned moving apparatus 100.

Additionally, the storage unit 32 stores operation history information in which machine IDs are associated with the operation histories of unmanned moving apparatuses 100. The operation histories include, for example, the cumulative operation distance, the cumulative operation time, the cumulative number of operations, the elapsed time since manufacture, the elapsed time since purchase, the maximum single operation distance, the maximum single operation time, the number of times a designated speed was not reached, the number of times an abnormality was detected in any component, or the like.

The "cumulative operation distance" is the cumulative value of the operation distance from when an unmanned moving apparatus 100 started being used. The "cumulative operation time" is the cumulative value of the operation time from when an unmanned moving apparatus 100 started being used. The "number of operations" is the number of operations for which an unmanned moving apparatus 100 has been used from when it started being used. The "elapsed time since manufacture" is the time from the date on which the unmanned moving apparatus 100 was manufactured until the present time. The "elapsed time since purchase" is the time from the date on which the unmanned moving apparatus 100 was purchased until the present time.

The "maximum single operation distance" is the operation distance for the longest distance operated among past operations. The "maximum single operation time" is the operation time for the longest time operated among past operations. The "number of times a designated speed was not reached" is the number of times that an apparatus could not move at a speed designated, for example, by a user terminal 200. The "number of times an abnormality was detected in any component" is the number of times an abnormality was detected in a component during past operations.

Furthermore, the storage unit 32 stores an inspection table in which model types of unmanned moving apparatuses 100 are associated with inspection threshold values. FIG. 3 illustrates an example of an inspection table. In the inspection table in FIG. 3, types of models are associated with inspection threshold values for each of multiple determination categories used for determining whether or not an inspection is required. The determination categories correspond to the operation histories included in the operation history information. As one example, it is determined that an inspection is required when a value indicated by the various types of data included in the operation history information becomes greater than an inspection threshold value corresponding to that data.

Since the required safety level can be expected to differ depending on the purpose of use, the inspection table illustrated in FIG. 3 has different inspection threshold values that are associated with each combination of the purpose of use and the model type. For example, purpose $\alpha$ is for monitoring, which involves capturing images during flight, and purpose $\beta$ for transporting goods. In this case, a higher level of safety is required for purpose $\beta$ than for purpose $\alpha$. Therefore, the inspection threshold value for purpose $\beta$ is set so that an inspection is determined to be required at a time earlier than that for purpose $\alpha$.

Additionally, the required safety level can be expected to differ also depending on the region in which the unmanned moving apparatus 100 is operating. Thus, in the inspection table illustrated in FIG. 3, different inspection threshold values are associated with each combination of the operation region and the model type. For example, the operation region X is a region other than a metropolitan area, and the operation region Y is the metropolitan area. In this case, a higher safety level is required in the operation region Y than in the operation region X. Therefore, the inspection threshold value for the operation region Y is set so that an inspection is determined to be required at a time earlier than that for operation region X.

In the inspection table illustrated in FIG. 3, inspection threshold values are indicated for each model type. However, inspection threshold values may be included for each component. Additionally, inspection threshold values corresponding to various conditions may be included, such as combinations of components with purposes of use, combinations of components with operation regions, combinations of model types with purposes of use and operation regions, etc. Additionally, the determination categories included in the inspection table are arbitrary, so that only some of the determination categories in the inspection table illustrated in FIG. 3 may be included, or other determination categories may be included.

Furthermore, in the inspection table illustrated in FIG. 3, inspection threshold values corresponding to all of the determination categories, associated with all of the model types, the purposes of use and the operation regions, are included. However, determination categories that are not used for determining whether or not inspection is required may be included depending on the model type, the purpose of use or the operation region. As one example, the quality of captured images transmitted from the unmanned moving apparatus 100 may be included as a determination category that is used for the purpose of monitoring using captured images, but that is not used for other purposes of use.

The storage unit 32 may also store conditions for being covered by insurance in which the user of the unmanned moving apparatus 100 is enrolled. The conditions for being covered by the insurance in which the user of the unmanned moving apparatus 100 is enrolled are, for example, the elapsed time from the time of purchase or the time of the last inspection of the unmanned moving apparatus 100, the cumulative operation amount from the time of purchase or the time of the last inspection of the unmanned moving apparatus 100, the operation region in which the unmanned moving apparatus 100 is to be operated, the purpose of use for which the unmanned moving apparatus 100 is to be operated, or the like.

The control unit 33 is, for example, a CPU (Central Processing Unit). The control unit 33 executes a program stored in the storage unit 32 and thereby functions as the acquisition unit 331, the identification unit 332, the reception unit 333, the determination unit 334, the output unit 335 and the generation unit 336.

The acquisition unit 331 acquires various types of information from multiple unmanned moving apparatuses 100 via the communication unit 31. The acquisition unit 331 acquires, from the unmanned moving apparatuses 100, machine IDs for identifying unmanned moving apparatuses 100 and information indicating operation amounts for which these unmanned moving apparatuses have been operated. The acquisition unit 331 updates the cumulative operation amounts by adding operation amounts acquired from the unmanned moving apparatuses 100 to the cumulative operation amounts stored in the storage unit 32 in association with the machine IDs.

The acquisition unit 331 may acquire, from an unmanned moving apparatus 100 that is being operated, a machine ID and operation state information including the continuous operation time from the start of operation of the unmanned moving apparatus 100, the continuous operation distance, the operation speed and the state (remaining battery level, power consumption rate) of a battery mounted on the unmanned moving apparatus 100.

When the unmanned moving apparatus 100 has detected an abnormality, the acquisition unit 331 may acquire, from the unmanned moving apparatus 100, error information indicating that an error has been detected in the unmanned moving apparatus 100, and the machine ID. The abnormality in the unmanned moving apparatus 100 is, for example, a malfunction in a component mounted on the unmanned moving apparatus 100. The acquisition unit 331 associates the acquired error information, the date and time at which the error information was acquired, and the machine ID, and stores the information in the storage unit 32 as error history information.

The identification unit 332 references the apparatus table stored in the storage unit 32 and identifies apparatus information stored in association with the machine ID acquired by the acquisition unit 331. The identification unit 332 outputs the identified apparatus information to the determination unit 334. The identification unit 332 may output a model type, a purpose of use or component information indicated by the identified apparatus information to the determination unit 334.

The reception unit 333 receives various types of input information from the user terminal 200 via the communication unit 31. The reception unit 333, for example, receives operation reservation data including a date and time at which the unmanned moving apparatus 100 is to be operated, and the operation route. The operation reservation data may include the purpose of use and the operation region of the unmanned moving apparatus 100. The operation reservation data may include information designating, by each position, the speed, the ascent speed or the altitude at which the unmanned moving apparatus 100 is to move at multiple positions on the operation route. The reception unit 333, for example, receives the operation reservation data together with a terminal ID. The reception unit 333 may receive user identification information instead of the terminal ID or together with the terminal ID. The reception unit 333 may receive instructions for determining whether or not an inspection is required instead of the operation reservation data or together with the operation reservation data.

Additionally, the reception unit 333 may receive, as input information from the user terminal 200, visual inspection results of the unmanned moving apparatus 100 by the user, or a captured image of the machine or a captured video of the machine (hereinafter referred to as "captured machine image, etc.") generated by the user having captured the unmanned moving apparatus 100. The visual inspection results include, for example, the machine ID, the inspection date and time, information regarding components that were replaced at time of the inspection or comments by the user. The captured machine image, etc. is, for example, an image, taken by the user, of a portion of the unmanned moving apparatus 100 in which a malfunction is suspected. The reception unit 333 outputs the operation reservation data, the visual inspection results, the captured machine image or the like to the determination unit 334.

The determination unit 334 determines whether or not the unmanned moving apparatus 100 requires to be inspected. When operation reservation data from the user terminal 200 is received by the reception unit 333 or when an instruction to determine whether or not an inspection is required is received by the reception unit 333, the determination unit 334 determines whether or not an inspection is required by comparing an inspection threshold value associated with the unmanned moving apparatus 100 that is to be inspected with a value indicated by the operation history of the unmanned moving apparatus 100. The determination unit 334, for example, determines whether or not an inspection is required by determining whether or not the cumulative operation amount acquired by the acquisition unit 331 is greater than an inspection threshold value included in the inspection table.

The determination unit 334 makes the determination by using an inspection threshold value, among multiple inspection threshold values stored in the storage unit 32, that corresponds to the model type or the purpose of use indicated by the apparatus information identified by the identification unit 332. For example, if the apparatus information identified by the identification unit 332 includes information indicating the model type of the unmanned moving apparatus 100, then the determination unit 334 selects an inspection threshold value that corresponds, in the inspection table, to the model type of the unmanned moving apparatus 100 included in the apparatus information.

If the reception unit 333 has received operation reservation data including one or more items of information among the purpose of use (transportation of goods, monitoring, etc.) of the unmanned moving apparatus 100 or the region (metropolitan area, mountainous area, etc.) in which the unmanned moving apparatus 100 is to be operated, then the identification unit 334 may select an inspection threshold value that corresponds, in the inspection table, to the model type of the unmanned moving apparatus 100 included in the apparatus information and the purpose of use or the operation region received by the reception unit 333. If the apparatus information identified by the identification unit 332 includes information regarding a component mounted on the unmanned moving apparatus 100, then the determination unit 334 may select an inspection threshold value used for determining whether or not the component indicated by the component information requires to be inspected.

If the operation reservation data indicates that an unmanned moving apparatus 100 (with the machine ID 0001) of model type A is to be used for the purpose α, then the determination unit 334 compares the values in one or more categories indicated by the operation history information of the unmanned moving apparatus 100 having the machine ID 0001 with inspection threshold values in determination categories corresponding to the one or more categories indicated by the operation history information associated with the combination of the purpose of use a and the model type A in the inspection data.

As one example, the determination unit 334 compares the cumulative operation distance, which is one of the cumulative operation amounts, with an inspection threshold value of the cumulative operation distance corresponding to the combination of the purpose α and the model type A in the inspection data. The determination unit 334 determines that an inspection is required if the value of the cumulative operation distance indicated by the operation history information is equal to or higher than the inspection threshold value, and determines that an inspection is not required if the value of the cumulative operation distance indicated by the operation history information is less than the inspection threshold value. The determination unit 334 notifies the output unit 335 of a first determination result of determining whether or not the cumulative operation amount is greater than the inspection threshold value.

The determination unit 334 may notify the output unit 335 of a second determination result of determining whether or not the frequency by which abnormalities have been detected is greater than a prescribed frequency threshold value, based on error history information indicating the history of abnormalities detected in the unmanned moving apparatus 100. In this case, the determination unit 334 determines whether or not the abnormality detection frequency indicated by the error history information stored in the storage unit 32 is greater than the prescribed frequency threshold value. The frequency threshold value is an inspection threshold value in the inspection table, and is a value defined, for example, as a value indicating a sign that the unmanned moving apparatus 100 requires to be inspected or repaired. The determination unit 334 notifies the output unit 335 of the second determination result determining whether or not the frequency by which abnormalities have been detected in the unmanned moving apparatus 100 is greater than the frequency threshold value.

As one example, the determination unit 334 references the error history information stored in the storage unit 32 and determines whether or not the acquisition unit 331 has acquired error information, indicating an abnormality in any of the components mounted on the unmanned moving apparatus 100, a number of times equal to or greater than an inspection threshold value "1", corresponding to the determination category "Number of times an abnormality was detected in any component (times)" in the inspection table.

The determination unit 334, for example, determines whether or not an inspection is required at the time that the reception unit 333 receives operation reservation data from the user terminal 200. However, the timing at which the determination unit 334 makes the determination is arbitrary. The determination unit 334 may determine whether or not the cumulative operation amount acquired is greater than the inspection threshold value at the time that the acquisition unit 331 acquires, from the unmanned moving apparatus 100, the operation amount from the start of operation of the unmanned moving apparatus 100. Additionally, the determination unit 334 may make the determination each time operation of the unmanned moving apparatus 100 ends. Additionally, the determination unit 334 may make the determination every prescribed period of time for an unmanned moving apparatus 100 that is stopped. The prescribed period of time is, for example, a period of time that is preset by the user of the unmanned moving apparatus 100.

The determination unit 334 may make multiple determinations using multiple inspection threshold values with respect to the same combination of the purpose of use, the model type and the determination category. For example, the determination unit 334 may make determinations using a warning inspection threshold value for warning the user that inspections are not being appropriately performed, and a prohibitive inspection threshold value for prohibiting the operation of the unmanned moving apparatus 100.

Additionally, based on the reception unit 333 having received operation reservation data, the determination unit 334 may determine whether or not the unmanned moving apparatus 100 satisfies conditions for being covered by insurance in which the user of the unmanned moving apparatus 100 is enrolled. For example, if the elapsed time from when the unmanned moving apparatus 100 was purchased being equal to or lower than a prescribed value is a condition for being covered by insurance, then the determination unit 334 determines whether or not the elapsed time from when the unmanned moving apparatus 100 was purchased satisfies this condition. The prescribed value is, for example, a value defined by a contract when the user enrolls in insurance.

If the elapsed time from when the unmanned moving apparatus 100 was last inspected being equal to or lower than a reference time or the cumulative operation amount from when the unmanned moving apparatus 100 was last inspected being equal to or lower than a reference amount is a condition for being covered by insurance, then the determination unit 334 determines whether or not the elapsed time is less than or equal to the reference time or the cumulative operation amount is less than or equal to the reference amount. The reference time or the reference amount is, for example, defined by a contract when the user enrolls in insurance.

If the purpose of use included in an operation reservation being for spraying agrochemicals is a condition for being covered by insurance, then the determination unit 334 determines whether or not the purpose of use included in the operation reservation received by the reception unit 333 is for spraying agrochemicals. The determination unit 334 notifies the output unit 335 of third determination results determining whether or not the unmanned moving apparatus 100 satisfies the conditions for being covered by the insurance in which the user of the unmanned moving apparatus 100 is enrolled.

Furthermore, the determination unit 334 may determine whether or not input information received by the reception unit 333 is information indicating that there is a malfunction in the unmanned moving apparatus 100. More specifically, the determination unit 334 performs text mining on the input information received by the reception unit 333 and extracts keywords. The determination unit 334 uses a character string as input data that is input to a trained machine learning model that provides, as output data, classification results obtained by classifying whether or not this character string is information indicating that there is a malfunction in the unmanned moving apparatus 100. The determination unit 334 determines whether or not the input information received by the reception unit 333 is information indicating that there is a malfunction in the unmanned moving apparatus 100 based on the classification results output by the machine learning model.

The determination unit 334 may also determine whether or not a captured machine image, etc. acquired by the acquisition unit 331 indicates that there is a malfunction in the unmanned moving apparatus 100. The determination unit 334 uses a captured image of the unmanned moving apparatus 100 as input data that is input to a trained machine learning model that provides, as output data, classification results obtained by classifying whether or not there is a malfunction in the unmanned moving apparatus 100. The determination unit 334 determines whether or not the captured machine image, etc. acquired by the acquisition unit 331 indicates that there is a malfunction in the unmanned moving apparatus 100 based on the classification results output by the machine learning model.

The output unit 335 transmits various types of data to the user terminal 200 via the communication unit 31. The output unit 335, for example, outputs determination results to the determination unit 334. In an example in the present description, the output unit 335 outputs the first determination result of determining whether or not the cumulative operation amount acquired from the unmanned moving apparatus 100 is greater than the inspection threshold value selected by the determination unit 334. The output unit 335 may output the second determination result of determining whether or not the frequency by which abnormalities have been detected in the unmanned moving apparatus 100 is greater than the frequency threshold value.

The output unit 335 identifies the user terminal 200 corresponding to the machine ID acquired by the acquisition unit 331. The output unit 335 outputs at least one of the first determination result or the second determination result with respect to the identified user terminal 200. In this way, the output unit 335 can make a user understand that the risk of an abnormality being detected in the unmanned moving apparatus 100 is relatively high.

The output unit 335 may output, to the identified user terminal 200, the third determination result indicating whether or not the unmanned moving apparatus 100 satisfies the conditions for being covered by the insurance in which the user of the unmanned moving apparatus 100 is enrolled. The output unit 335 outputs, to the user terminal 200 corresponding to the machine ID acquired by the acquisition unit 331, the third determination result indicating whether or not the unmanned moving apparatus 100 satisfies the conditions for being covered by the insurance in which the user of the unmanned moving apparatus 100 is enrolled. In this way, the output unit 335 can be made to allow a user to understand that the unmanned moving apparatus 100 scheduled to be operated is covered by insurance.

Figure 4:
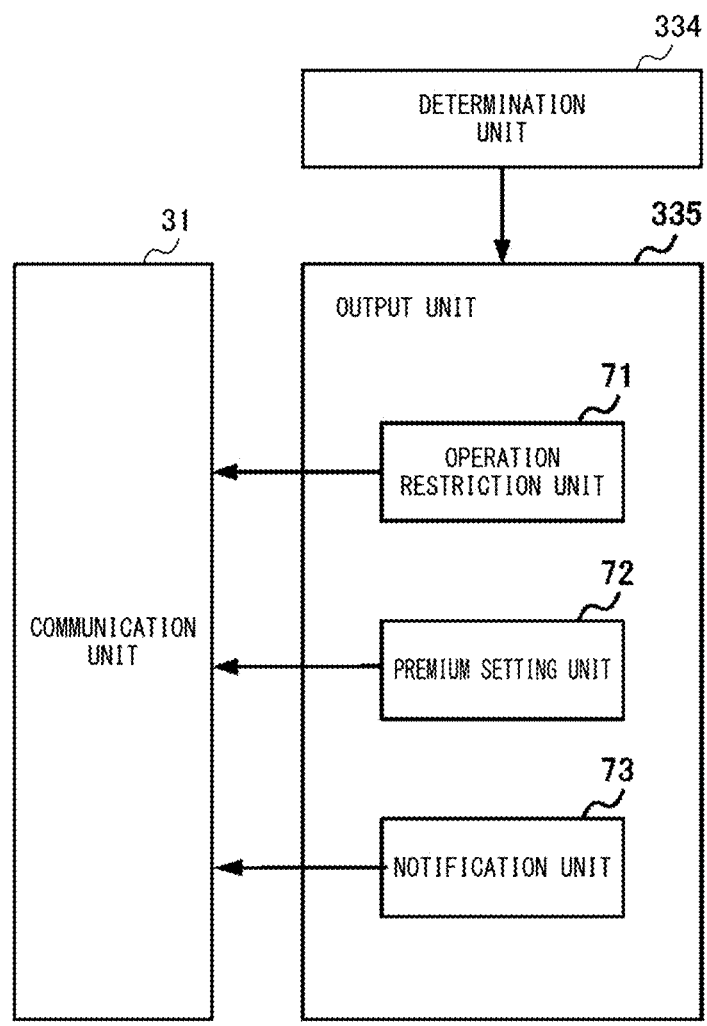
FIG. 4 illustrates the structure of an output unit.

FIG. 4 illustrates the structure of the output unit 335. The output unit 335 comprises an operation restriction unit 71, a premium setting unit 72 and a notification unit 73. The operation restriction unit 71 transmits operation schedule data corresponding to operation reservation data received by the reception unit 333, together with this operation reservation data, to the unmanned moving apparatus 100 owned by the user corresponding to the terminal ID acquired by the acquisition unit 331. If the determination unit 334 has determined that the unmanned moving apparatus 100 requires to be inspected (for example, if the determination unit 334 has determined that the cumulative operation amount is greater than the inspection threshold value), then the operation restriction unit 71 prohibits the operation of this unmanned moving apparatus 100. In this case, the operation restriction unit 71 does not transmit operation schedule data to this unmanned moving apparatus 100. The operation restriction unit 71, after prohibiting the operation of the unmanned moving apparatus 100, does not transmit the operation schedule data to the unmanned moving apparatus 100 until an inspection is performed on this unmanned moving apparatus 100.

On the other hand, if the determination unit 334 has determined that the unmanned moving apparatus 100 does not require to be inspected (for example, if the determination unit 334 has determined that the cumulative operation amount is less than or equal to the inspection threshold value), then the operation restriction unit 71 allows the operation of this unmanned moving apparatus 100. In this case, the operation restriction unit 71 transmits the operation schedule data to this unmanned moving apparatus 100. The unmanned moving apparatus 100 is operated on the basis of this operation schedule data.

The operation restriction unit 71 may allow the operation of the unmanned moving apparatus 100 on the condition that the determination unit 334 has determined that the conditions for the unmanned moving apparatus 100 to operate have been satisfied for all determinations corresponding to multiple inspection threshold values included in the inspection table associated with any of the model type, the purpose of use or the operation region of the unmanned moving apparatus 100. On the other hand, the operation restriction unit 71 prohibits the operation of the unmanned moving apparatus 100 if the determination unit 334 has determined that the unmanned moving apparatus 100 does not satisfy any of the inspection threshold values among the multiple inspection threshold values included in the inspection table in association with any of the model type, the purpose of use or the operation region.

The premium setting unit 72 determines an insurance premium for insurance in which the user of the unmanned moving apparatus 100 is enrolled, and outputs the determined insurance premium. If the number of occurrences of accidents or malfunctions is low despite the cumulative operation amount of the unmanned moving apparatus 100 being large, then the risk that an abnormality will occur due to the user operating the unmanned moving apparatus 100 can be estimated to be low. For this reason, if the cumulative operation amount acquired by the acquisition unit 331 is greater than an inspection threshold value, then the premium setting unit 72 lowers the insurance premium of insurance in which the user of the unmanned moving apparatus 100 is enrolled. If the cumulative operation amount acquired by the acquisition unit 331 is greater than the inspection threshold value and the error history information stored in the storage unit 32 indicates that the frequency of acquisition of error information from the unmanned moving apparatus 100 is lower than a frequency threshold value, then the premium setting unit 72 may lower the insurance premium. The insurance premium setting unit 72 notifies the user of the insurance premium that has been determined.

On the other hand, if the cumulative operation amount acquired by the acquisition unit 331 is lower than the inspection threshold value and the error history information stored in the storage unit 32 indicates that the frequency of acquisition of error information from the unmanned moving apparatus 100 is higher than the frequency threshold value, then the premium setting unit 72 estimates that the risk of an abnormality being detected in the operating environment in which the unmanned moving apparatus 100 operates is relatively high, and raises the insurance premium. Thus, the premium setting unit 72 can set an appropriate insurance premium in accordance with the frequency by which the unmanned moving apparatus 100 has been inspected and the frequency by which abnormalities have been detected.

The notification unit 73 identifies the user terminal 200 corresponding to the machine ID acquired by the acquisition unit 331. The notification unit 73 notifies the user terminal 200 of one or more of the first determination result, the second determination result or the third determination result.

The notification unit 73 may notify the user terminal 200 of determination results determined by the determination unit 334 based on an inspection threshold value different from that in the operation restriction unit 71. For example, if the determination unit 334 has selected each of a warning inspection threshold value for warning the user that inspections are not being appropriately performed and a prohibitive inspection threshold value for prohibiting the operation of the unmanned moving apparatus 100, then the notification unit 73 may notify the user terminal 200 of the first determination result of determining whether or not the cumulative operation amount is greater than the warning inspection threshold value selected by the determination unit 334. Meanwhile, the operation restriction unit 71 may prohibit the operation of the unmanned moving apparatus 100 if the cumulative operation amount is greater than the prohibitive inspection threshold value selected by the determination unit 334, and may allow the unmanned moving apparatus 100 to be operated if the cumulative operation amount is equal to or less than the prohibitive inspection threshold value. The prohibitive inspection threshold value is, for example, a value greater than the warning inspection threshold value.

[Generation of Inspection Table]

The generation unit 336, as illustrated in FIG. 3, generates an inspection table in which model types of unmanned moving apparatuses 100 are associated with inspection threshold values. As one example, the generation unit 336 generates an inspection table in which model types of unmanned moving apparatuses 100 are associated with inspection threshold values based on statistical information regarding malfunctions that have occurred in the past in multiple unmanned moving apparatuses 100. In order to generate the inspection table, the generation unit 336 acquires, from an external apparatus (not illustrated in the drawings) that manages the operation of multiple unmanned moving apparatuses 100, information including examples of cases in which malfunctions have occurred in the past in multiple unmanned moving apparatuses 100, the frequency by which each unmanned moving apparatus 100 was being inspected and the model type of each unmanned moving apparatus 100.

The generation unit 336 statistically analyzes the information that has been acquired and thereby identifies, for each model type, the frequency by which an unmanned moving apparatus 100 should be inspected in order to be able to suppress malfunctions. The generation unit 336 sets, for each model type, an inspection threshold value for inspecting the unmanned moving apparatus 100 at the identified frequency. The generation unit 336 may generate an inspection table including inspection threshold values associated with the purposes for which the unmanned moving apparatuses 100 are to be operated or the regions in which the unmanned moving apparatuses 100 are to be operated.

The generation unit 336 may set inspection threshold values by using a trained machine learning model. The generation unit 336 may group multiple unmanned moving apparatuses 100 of the same model type and with the same purpose of use, including unmanned moving apparatuses 100 in which abnormalities have been detected, malfunctions have occurred or the like in the past, by the inspection threshold values utilized for inspecting each of the unmanned moving apparatuses 100, and may compute, for each group, the frequencies by which abnormalities are detected, malfunctions occur or the like. The generation unit 336 trains the machine learning model with training data in which the inspection threshold values are associated with the computed frequencies by which abnormalities are detected, thereby generating a trained machine learning model. The generation unit 336 inputs, as input data into the trained machine learning model, the frequencies of detection of abnormalities that are tolerable in terms of ensuring business profitability or the like, and acquires inspection threshold values that have been output, as output data, from the machine learning model.

[Selection of Unmanned Moving Apparatus 100 to be Operated Next]

The output unit 335 may output the results of selection, by the determination unit 334, of an unmanned moving apparatus 100 to be operated next among multiple unmanned moving apparatuses 100 based on a machine ID and a cumulative operation amount that the acquisition unit 331 has acquired from each of the multiple unmanned moving apparatuses 100. For example, the determination unit 334 selects the unmanned moving apparatus 100 having the smallest cumulative operation amount acquired by the acquisition unit 331 so that there will not be an imbalance in the cumulative operation amounts in the multiple unmanned moving apparatuses 100 owned by a single user.

The determination unit 334 may select the unmanned moving apparatus 100 with the least battery deterioration based on battery deterioration states. For example, the output unit 335 estimates an unmanned moving apparatus 100 by means of information indicating the battery deterioration state acquired from each of the multiple unmanned moving apparatuses 100.

Additionally, the determination unit 334 may identify the battery deterioration state in each of the multiple unmanned moving apparatuses based on the continuous operation times from the start of operation of the unmanned moving apparatuses 100, the continuous operation distances, the operation speeds and the states (remaining battery level, power consumption rate) of batteries mounted on the unmanned moving apparatuses 100 acquired by the acquisition unit 331 from the multiple unmanned moving apparatuses 100 that are being operated. For example, the determination unit 334 identifies the rates at which the remaining battery levels decrease with respect to the continuous operation times or the continuous operation distances, and identifies each battery deterioration state on the basis of the identified rate. The determination unit 334 may select the unmanned moving apparatus 100 in which the identified battery deterioration is the lowest.

Additionally, the determination unit 334 may select a different unmanned moving apparatus 100 in accordance with the operation route, the purpose of use or the like indicated by an operation reservation received by the reception unit 333 for the next flight. For example, if an operation route indicated by an operation reservation received by the reception unit 333 for the next flight passes through a metropolitan area, then the determination unit 334 may select the unmanned moving apparatus 100 for which the error history information stored in the storage unit 32 indicates that the frequency by which error information was acquired from the unmanned moving apparatus 100 is the lowest. On the other hand, if an operation route included in an operation reservation received by the reception unit 333 for the next flight does not pass through a metropolitan area, then the determination unit 334 may select the unmanned moving apparatus 100 with the lowest cumulative operation amount.

[Transmission of Information Indicating Malfunction Details]

If the determination unit 334 has determined that input information received by the reception unit 333 or a captured machine image, etc. acquired by the acquisition unit 331 indicates that there is a malfunction in an unmanned moving apparatus 100, the output unit 335 may transmit the captured machine image, etc. to a prescribed contact destination. The prescribed contact destination is, for example, an external terminal (not illustrated in the drawings) managed by a business for repairing unmanned moving apparatuses 100. Thus, the output unit 335 can request the business for repairing unmanned moving apparatuses 100 to examine or repair an unmanned moving apparatus 100, in connection with a malfunction in the unmanned moving apparatus 100.

[Flow of Process to Determine Whether or not Inspection is Required]

Figure 5:
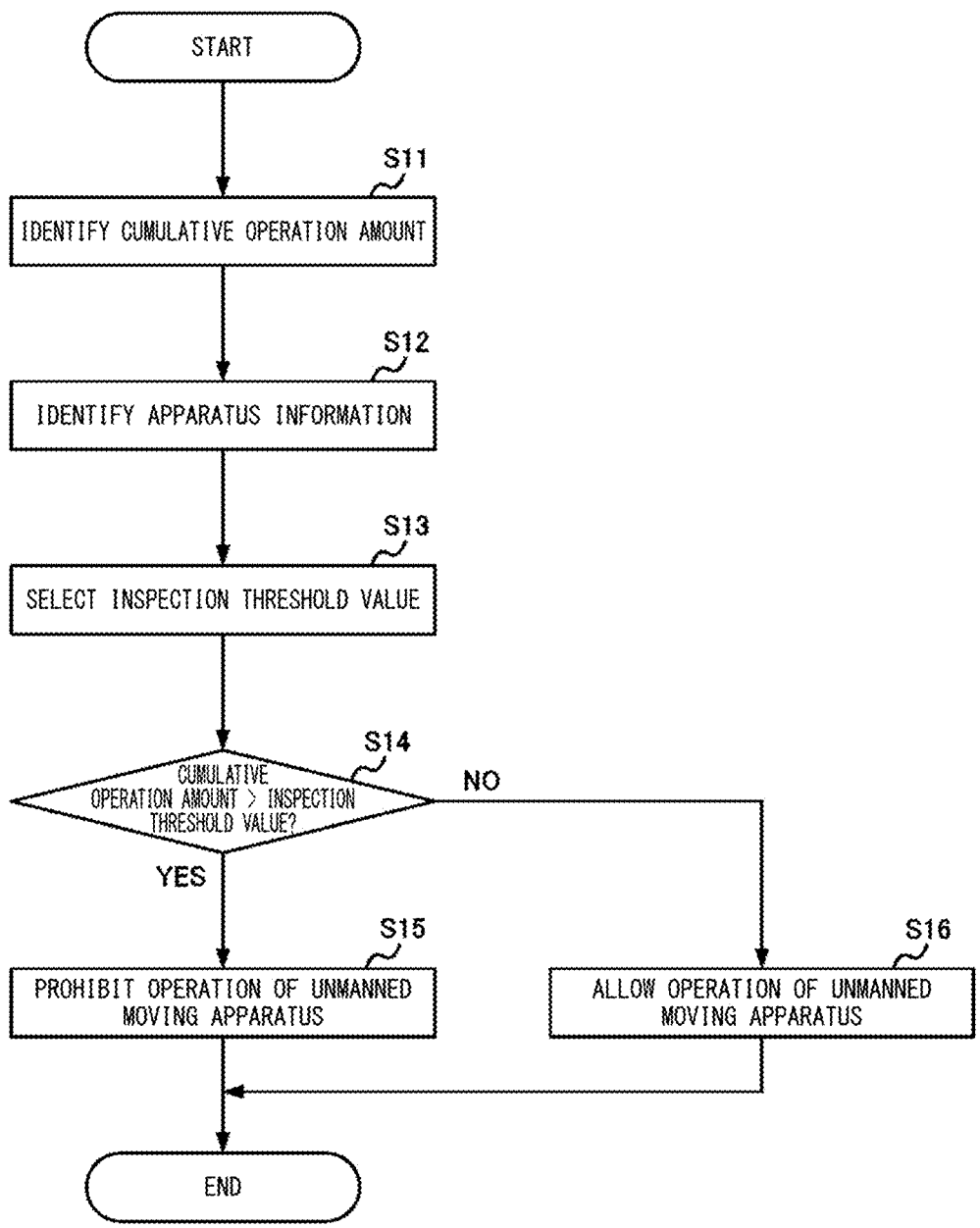
FIG. 5 is a flow chart indicating a processing sequence for the information output apparatus to determine whether or not an inspection is required.

FIG. 5 is a flow chart indicating a processing sequence for the information output apparatus 300 to determine whether or not an inspection is required. The processing sequence in FIG. 5 is, for example, started when the reception unit 333 receives an operation reservation for operating an unmanned moving apparatus 100.

First, the acquisition unit 331 acquires, from the user terminal 200, operation reservation data and a machine ID identifying the unmanned moving apparatus 100. The acquisition unit 331 references operation history information stored in the storage unit 32 and identifies a cumulative operation amount stored in association with the acquired machine ID (S11). The identification unit 332 references an apparatus table stored in the storage unit 32 and identifies apparatus information stored in association with the machine ID acquired by the acquisition unit 331 (S12). The determination unit 334 selects, from among multiple inspection threshold values relating to when the unmanned moving apparatus 10 requires to be inspected, an inspection threshold value corresponding to the apparatus information identified by the identification unit 332 (S13).

The determination unit 334 determines whether or not a new cumulative operation amount acquired by the acquisition unit 331 is greater than the selected inspection threshold value (S14). If the determination unit 334 determines that the cumulative operation amount is greater than the selected inspection threshold value (YES in S14), then the operation restriction unit 71 prohibits operation of the unmanned moving apparatus 100 (S15), and the processing ends. On the other hand, if the determination unit 334 determines, by the determination in S14, that the cumulative operation amount is less than or equal to the inspection threshold value, then the operation restriction unit 71 allows operation of the unmanned moving apparatus 100 (S16).

Figure 6:
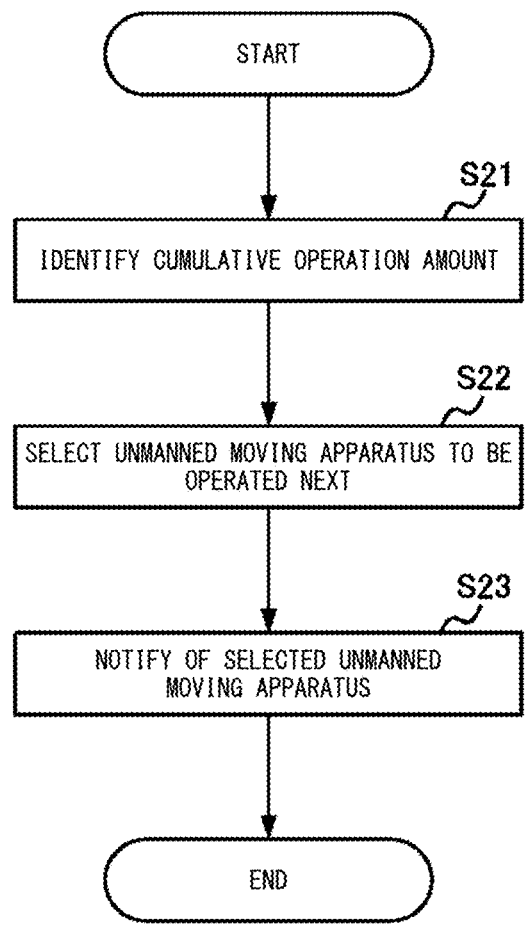
FIG. 6 is a flow chart indicating a processing sequence for the information output apparatus to select an unmanned moving apparatus.

FIG. 6 is a flow chart indicating a processing sequence for the information output apparatus 300 to select an unmanned moving apparatus 100. The processing sequence in FIG. 6 is, for example, started when the reception unit 333 receives the next operation reservation for operating an unmanned moving apparatus 100.

First, the acquisition unit 331 references a user table stored in the storage unit 32 and acquires multiple machine IDs stored in association with terminal IDs acquired by the acquisition unit 331 together with the information indicating the operation reservation. The acquisition unit 331 references operation history information stored in the storage unit 32 and identifies each of multiple cumulative operation amounts corresponding to the multiple machine IDs that have been acquired (S21).

The determination unit 334 selects, as the unmanned moving apparatus to be operated next, from among the multiple unmanned moving apparatuses 100 corresponding to the multiple machine IDs acquired by the acquisition unit 331, the unmanned moving apparatus 100 with the lowest cumulative operation amount that was acquired (S22). The notification unit 73 notifies the user terminal 200 corresponding to the terminal ID acquired by the acquisition unit 331 of the unmanned moving apparatus 100 selected by the determination unit 334 (S23), and the processing ends.

Effects of Present Embodiment

The determination unit 334 determines whether or not the cumulative operation amount of an unmanned moving apparatus 100 designated by a user is higher than an inspection threshold value selected based on the model type of the unmanned moving apparatus 100, the purpose of use of the unmanned moving apparatus 100, or component information. Thus, the information output apparatus 300 can allow the user to understand whether or not inspections of the unmanned moving apparatus 100 are being performed at appropriate times.

Due to the present embodiment, it is possible to contribute to Goal 9, "to build infrastructures for industrialization and to foster innovation" among the sustainable development goals (SDGs) advanced by the United Nations.

As mentioned above, various features are proposed regarding an information output apparatus, an information output method and a program for managing an unmanned moving apparatus.

In order to maintain states in which unmanned moving apparatuses can safely move, periodic inspections of unmanned moving apparatuses are widely performed. The method described in Patent Document 1 had the problem that it is not possible to determine whether or not an unmanned moving apparatus is being inspected with appropriate frequency.

According to at least one of the exemplary embodiments, for example, the effect of allowing a user to understand whether or not an unmanned moving apparatus is being inspected with appropriate frequency is obtained.

While the present invention has been explained by referring to embodiments above, it should be understood that the technical scope is not limited to the scope described among the embodiments above, and that various modifications and changes can be made within the scope and spirit thereof. For example, all or part of the apparatus may be configured by being functionally or physically distributed or integrated in arbitrary units. Additionally, new embodiments obtained by arbitrarily combining multiple embodiments are also included among the present embodiments. The effects of the new embodiments created by these combinations are a combination of the effects of the original embodiments.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An information output apparatus comprising:
   an acquisition unit that acquires machine identification information for identifying an unmanned moving apparatus and information indicating an operation amount by which the unmanned moving apparatus has been operated;
   an identification unit that identifies at least one of a model type of the unmanned moving apparatuses, a purpose of use of the unmanned moving apparatuses, an operation region of the unmanned moving apparatus or component information indicating a component included in the unmanned moving apparatuses, which are associated with the machine identification information acquired by the acquisition unit, as an attribute of the unmanned moving apparatus;
   a selection unit that selects an inspection threshold value corresponding to the attribute identified by the identification unit;
   a determination unit that determines whether or not a cumulative operation amount calculated by cumulating the operation amount is greater than the inspection threshold value selected by the selection unit; and
   an output unit that outputs determination results from the determination unit.

2. The information output apparatus according to claim 1, further comprising:
   an operation restriction unit that prohibits operation of the unmanned moving apparatus if the determination unit has determined that the cumulative operation amount is greater than the inspection threshold value selected by the selection unit.

3. The information output apparatus according to claim 1, wherein:
   the acquisition unit respectively acquires the machine identification information and the cumulative operation amounts of multiple unmanned moving apparatuses; and
   the selection unit selects the unmanned moving apparatus to be operated next among the multiple unmanned moving apparatuses, based on the machine identification information and cumulative operation amounts of the multiple unmanned moving apparatuses.

4. The information output apparatus according to claim 1, wherein:
   the determination unit determines, based on error history information indicating a history of abnormalities detected in the unmanned moving apparatus, whether or not a frequency by which the abnormalities have been detected is greater than a prescribed frequency threshold value; and
   the output unit outputs a first determination result of a determination by the determination unit regarding whether or not the cumulative operation amount is greater than the inspection threshold value selected by the selection unit, and a second determination result of a determination by the determination unit regarding whether or not the frequency by which abnormalities have been detected is greater than the frequency threshold value.

5. The information output apparatus according to claim 1, further comprising:
   a storage unit that stores condition regarding an elapsed time period since the unmanned moving apparatus was purchased, an elapsed time period since the unmanned moving apparatus was last inspected, the cumulative operation amount or a purpose of use, for being covered by insurance in which a user of the unmanned moving apparatus is enrolled; and
   a reception unit that receives an operation reservation for operating the unmanned moving apparatus;
   wherein
   the determination unit determines whether or not the unmanned moving apparatus satisfies the condition based on the reception unit having received the operation reservation.

6. The information output apparatus according to claim 1, wherein:
   the acquisition unit acquires a captured machine image generated by capturing an image of the unmanned moving apparatus, and
   the information output apparatus further comprises,
   a reception unit that receives input information that has been input by a user of the unmanned moving apparatus in association with the captured machine image; and
   a transmission control unit that transmits the captured machine image to a prescribed contact destination if it is determined that the input information indicates malfunction details.

7. The information output apparatus according to claim 1, further comprising:
a generation unit that generates an inspection table in which the model types of the unmanned moving apparatuses are associated with the inspection threshold values based on statistical information regarding malfunctions that have occurred in the past in the multiple unmanned moving apparatuses,
wherein the identification unit identifies the model type of the unmanned moving apparatuses as the attribute of the unmanned moving apparatuses, and
the selection unit references the inspection table and identifies the inspection threshold value that corresponds, in the inspection table, to the model type of the unmanned moving apparatus identified by the identification unit.

8. The information output apparatus according to claim 1, further comprising:
a premium setting unit that lowers an insurance premium on insurance in which the user of the unmanned moving apparatus is enrolled if the cumulative operation amount is greater than the inspection threshold value.

9. An information output method, to be executed by a computer, the information output method comprising:
acquiring machine identification information for identifying an unmanned moving apparatus and information indicating an operation amount by which the unmanned moving apparatus has been operated;
identifying at least one of a model type of the unmanned moving apparatuses, a purpose of use of the unmanned moving apparatuses, an operation region of the unmanned moving apparatus or component information indicating a component included in the unmanned moving apparatuses, which are associated with the machine identification information that has been acquired, as an attribute of the unmanned moving apparatus;
selecting an inspection threshold value corresponding to the attribute that has been identified;
determining whether or not a cumulative operation amount calculated by cumulating the operation amount is greater than the inspection threshold value that has been selected; and
outputting determination results.

10. A non-transitory computer-readable recording medium storing a program that causes a computer to perform processes, the processes comprising:
acquiring machine identification information for identifying an unmanned moving apparatus and information indicating an operation amount by which the unmanned moving apparatus has been operated;
identifying at least one of a model type of the unmanned moving apparatuses, a purpose of use of the unmanned moving apparatuses, an operation region of the unmanned moving apparatus or component information indicating a component included in the unmanned moving apparatuses, which are associated with the machine identification information that has been acquired, as an attribute of the unmanned moving apparatus;
selecting an inspection threshold value corresponding to the attribute that has been identified;
determining whether or not a cumulative operation amount calculated by cumulating the operation amount is greater than the inspection threshold value that has been selected; and
outputting determination results.

* * * * *